UNITED STATES PATENT OFFICE.

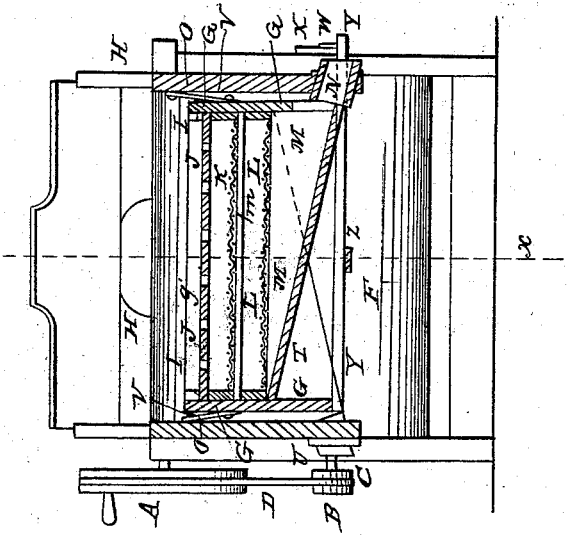

CHARLES K. EHLE, OF GREENBUSH, WISCONSIN.

IMPROVEMENT IN FANNING-MILLS.

Specification forming part of Letters Patent No. 56,912, dated August 7, 1866.

*To all whom it may concern:*

Be it known that I, CHARLES K. EHLE, of Greenbush, in the county of Sheboygan and State of Wisconsin, have invented a new and useful Improvement in Fan-Mills; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved fan-mill, taken through the line $x\,x$, Fig. 2. Fig. 2 is a vertical cross-section of the same, taken through the line $y\,y$, Fig. 1.

Similar letters of reference indicate like parts.

My invention has for its object to furnish an improved fan-mill, simple in construction, strong, and durable, by means of which the wheat may be easily and rapidly freed from oats, straw, and chaff, and which will, at the same time, answer every purpose for cleaning all other kinds of grain; and it consists, first, in the construction of the drum, which is made with its front extended upward and its top extended forward and upward, so as to form a throat, through which the wind is discharged immediately beneath the hopper and above the screens; second, in the combination of the stationary cross-bar and perforated screen-board with each other and with the shoe of the mill, for the purpose of separating the oats, straw, chaff, &c., from the wheat; third, in the combination of a screen, trough, and spout with each other, with the shoe, and with the side of the mill, for the purpose of receiving and conducting away the oats and light grain that may have passed over the perforated screen-board; fourth, in the combination of the sieves, trough, and spout with each other, with the shoe, and with the side of the mill, for the purpose of receiving and conducting away the cleaned wheat; fifth, in the combination of the board, trough, and spout with each other, with the shoe, and with the side of the mill, for the purpose of receiving and conveying away the fine seeds that may have been separated from the wheat, the whole being constructed and arranged as hereinafter more fully described.

A is the crank-pulley. B is a pulley attached to the projecting end of the fan-shaft C. D is a band passing around the pulleys A and B, for the purpose of communicating motion to the fans E. The pulleys A and B and band D may be replaced by gear or cog wheels meshing into each other, if desired. The fans E are made and attached to the fan-shaft C in the ordinary manner.

F is the drum, the front side, $f'$, of which is carried up so as to overlap the rear end, $g'$, of the shoe G, as shown in Fig. 1. The top $f^2$ of the drum F is carried upward and forward, as shown, until it meets the bottom edge of the hopper H, thus forming a throat, through which the blast passes to come in contact with the grain as it falls from the hopper H. As the grain falls from the hopper H it encounters the blast from the drum F, by which the oats, chaff, straw, &c., are blown forward of the stationary bar I and upon the perforated screen-board J, the clean wheat falling in the rear of the said stationary bar I upon the sieve K, through which it passes, and slides along the screen L to the trough M. The trough M is inclined, as shown in figure, and terminates in the spout N, to the mouth of which the bag may be attached for the reception of the cleaned wheat. The top of the trough M is covered with a board, $m'$, to guard against the possibility of its overflowing. The bar I is stationary, its ends being firmly secured to the sides O of the mill.

The perforated screen-board J is placed in grooves in the sides G of the shoe, and inclines toward the front of the mill, as shown. The straw, chaff, oats, light grain, &c., which have been blown over the bar I pass down along the board J to its lower edge. At this point the oats, light grain, and the heavier parts of the straw drop down upon the sieve P, whence the straw, &c., pass out of the mill; but the oats and light grain pass through into the trough R, whence they pass through the spout into bags attached to the outer end of said spout, said spout being attached to the side O of the mill in the manner before described with reference to the spout N and trough M. Any heavy straw or other substance that may have fallen down with the wheat in the rear of the stationary bar I passes down over the sieve K, board $m'$, and sieve P, and escapes at the front of the mill, as before described.

As the wheat is passing down the sieve L any grass-seed or other small seeds that may be mixed with it will pass through the said sieve L to the inclined board S, down which they pass to the trough T. From the trough T they pass through the spout V into bags attached to the projecting end of said spout, in the manner before described.

All the sieves and screens incline toward the forward part of the mill, as shown in the drawings, so that the grain, while passing through the said sieves and screens, is always moving forward.

The shoe is hung from the sides O of the mill by bars V, pivoted to the said sides O and to the sides G of the shoe, as shown in Figs. 1 and 2.

W is a connecting-rod, one end of which is pivoted to the crank-wheel X, attached to the end of the crank-shaft C, and its other end to the end of the lever Y. This lever passes in through a slot in the side O of the mill and is pivoted to the opposite side. To the middle part of this lever Y is pivoted a bar, Z, the other end of which is attached to the cross-bar $g^2$ of the shoe G. By this arrangement the revolution of the fan-shaft C shakes the shoe in a longitudinal direction.

What I claim as new, and desire to secure by Letters Patent, is—

1. Constructing the drum with its front side extended upward and its top extended forward and upward, so as to form a throat, through which the wind is discharged immediately beneath the hopper and above the screens, substantially as described, and for the purpose set forth.

2. The combination of the cross-bar I and perforated screen-board J with each other and with the shoe G of the mill, substantially as described, and for the purpose set forth.

3. The combination and arrangement of the sieve P, trough R, and discharging-spout with each other, with the shoe G, and with the side O of the mill, substantially as described, and for the purpose set forth.

4. The combination of the sieves K L, trough M, and spout N with each other, with the shoe G, and with the side O of the mill, substantially as described, and for the purpose set forth.

5. The combination of the inclined board S, trough T, and spout V with each other, with the shoe G, and with the side O of the mill, substantially as described, and for the purpose set forth.

CHARLES K. EHLE.

Witnesses:
ELIJAH ELLIOTT,
JAS. A. EHLE.